Dec. 9, 1958   C. F. HETTINGER   2,863,252
EYELET WITH SHEAVE FOR FISHING ROD
Filed Dec. 13, 1955
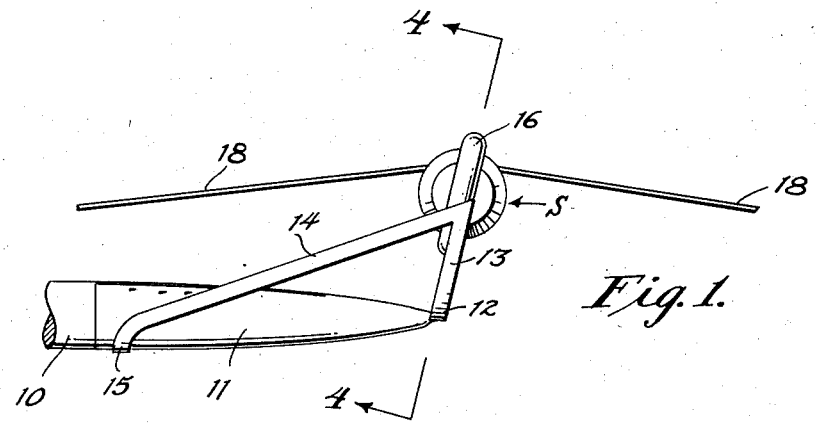
Fig. 1.
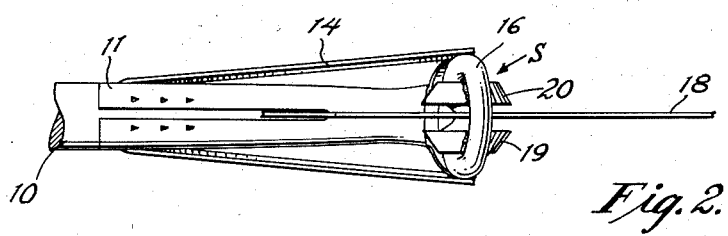
Fig. 2.
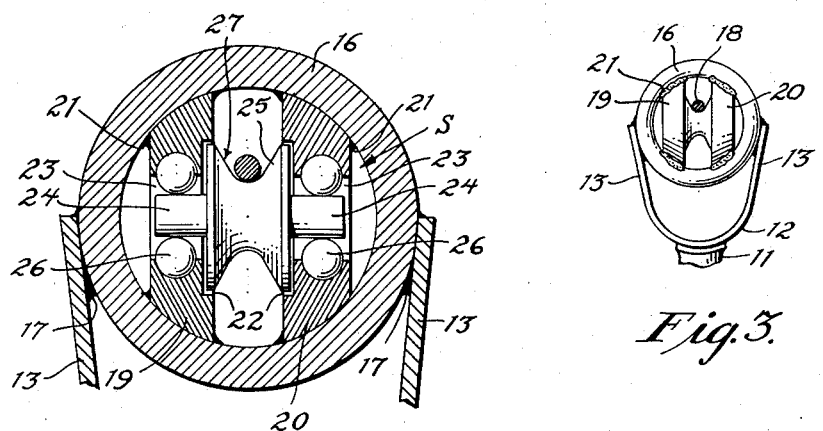
Fig. 4.
Fig. 3.
INVENTOR.
CHARLES F. HETTINGER
BY
HIS ATTORNEY.

United States Patent Office 2,863,252
Patented Dec. 9, 1958

2,863,252

EYELET WITH SHEAVE FOR FISHING ROD

Charles F. Hettinger, Merchantville, N. J.

Application December 13, 1955, Serial No. 552,741

1 Claim. (Cl. 43—24)

The present invention relates to fishing rods, and is concerned primarily with the eyelet that is ordinarily provided at the tip or free end of such a rod, and through which eyelet the line passes.

A conventional fishing rod ordinarily carries a reel on which a line is wound. During use of the rod, the line passes out along and over the rod, and it is now conventional practice to provide an eyelet at the tip or free end of the rod, through which eyelet the line passes. This eyelet serves as a guide for the line.

With the now known arrangements, the line engages the eyelet with an appreciable amount of friction which creates a drag on the line which is highly undesirable.

With the foregoing conditions in mind, the present invention has in view as its foremost objective the provision of an eyelet of the character indicated which includes means for reducing the friction on the line. This means preferably takes the form of a sheave or pulley that is operatively mounted within the eyelet, and over which the line passes.

More in detail, the invention has as an object the provision of an eyelet for a fishing rod of the character indicated which includes a sheave that is mounted on bearings so that the sheave will rotate freely and thus reduce to an absolute minimum frictional resistance to movement of the line.

Various other more detailed objects and advantages of the invention, such as arise in connection with carrying out the above-noted ideas in a practical embodiment, will in part become apparent and in part be hereinafter stated as the description of the invention proceeds.

The invention therefore comprises an eyelet that is intended to be mounted at the tip of a fishing rod, and which eyelet includes a sheave that is mounted on bearings and over which the line passes.

For a full and more complete understanding of the invention, reference may be had to the following description and accompanying drawings, wherein:

Figure 1 is a view in side elevation of the tip or free end of a fishing rod, with the eyelet and sheave of this invention applied thereto.

Figure 2 is a top plan view of the mechanism illustrated in Figure 1.

Figure 3 is a view in end elevation of the eyelet and sheave and the supporting structure therefor; and Figure 4 is a detailed view taken on an enlarged scale and as a section through the eyelet about on the plane represented by the line 4—4 of Figure 1.

Referring now to the drawing, wherein like reference characters denote corresponding parts, a portion of a fishing rod is represented at 10. Mounted on the rod 10 is a ferrule 11, which preferably is of an appropriate metal, and which ferrule has a conical bore which receives the tip or free end of the rod 10 in a well-known manner.

Upstanding from the free end of the ferrule 11 is a U-shaped bracket 12 providing diverging arms 13 that extend both upwardly and outwardly or forwardly. These arms 13 are held in position by supporting braces 14, the upper free ends of which are joined to the upper free ends of the arms 13, and the lower or inner ends of which are joined by a bend 15 that is secured to the underside of the ferrule 11 in any preferred manner, such as by being fused thereto.

An eyelet is designated 16. It consists of a metallic ring that is secured to and between the upper free ends of the arms 13 in any preferred manner, such as by the welded joints indicated at 17. In accordance with all accepted practice, a fishing line, such as represented at 18, is carried by a reel on the rod 10, and this line 18 passes through the eyelet 16.

A sheave assembly is referred to in its entirety by the reference character S, and is mounted within eyelet 16. The sheave assembly S comprises a pair of discs 19 and 20 which preferably are of metal, and which discs are secured in position in spaced relation within the eyelet 16, such as by the welded joints indicated at 21. Each of these discs is preferably formed with an inwardly extending recess 22 for a purpose to be later specified, and a bearing opening 23, with the bearing openings 23 in the two discs 19 and 20 in alignment.

A shaft 24 has end portions that are received in the openings 23. A sheave or pulley 25 is drivably mounted on the shaft 24 and extends partially into the recesses 22. The space between the end portions of this shaft 24 and the walls of the openings 23 receives ball bearings 26. It is evident that these bearings permit the sheave 25, together with the shaft 24, to spin with a minimum of frictional resistance.

The sheave 25 is formed with an annular groove 27 that receives the line 18.

It is evident that with the line 18 passing through the eyelet 16, it is confined therein, and definite assurance is had that it will remain in operative engagement with the sheave 25. As the line 18 is taken in or paid out, the sheave 25 is rotated, but this is accomplished with a minimum of frictional resistance. Thus, the drag on the line 18 is reduced to an absolute minimum.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claim.

What is claimed is:

In combination, a ferrule having a bore adapted to receive the tip of a fishing rod, a U-shaped bracket outstanding from the free end of said ferrule, an eyelet carried by said U-shaped bracket, and a sheave assembly mounted in said eyelet, said sheave assembly comprising a pair of spaced discs secured to said eyelet, a shaft extending between and journaled in said discs, a sheave drivably mounted on said shaft, and bearings interposed between said discs and shaft, with the sheave being formed with an annular groove adapted to receive a line passing through said eyelet.

References Cited in the file of this patent

UNITED STATES PATENTS

| | | |
|---|---|---|
| 135,722 | Moore | Feb. 11, 1873 |
| 2,262,300 | Reynolds | Nov. 11, 1941 |
| 2,740,221 | Kono | Apr. 3, 1956 |
| 2,805,509 | Inglis | Sept. 10, 1957 |